P. T. LENNON.
CUTTING TOOL AND HOLDER THEREFOR.
APPLICATION FILED OCT. 11, 1920.
1,387,417.
Patented Aug. 9, 1921.
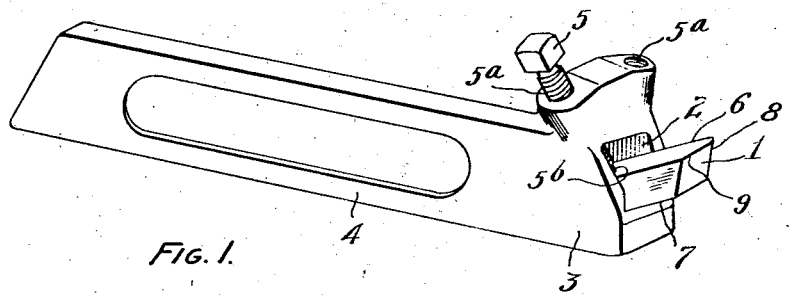
Fig. 1.
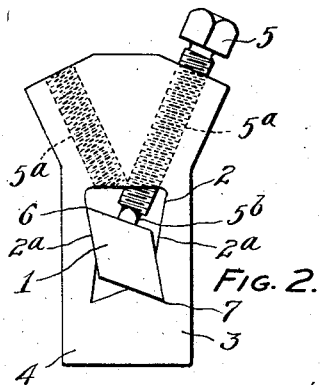
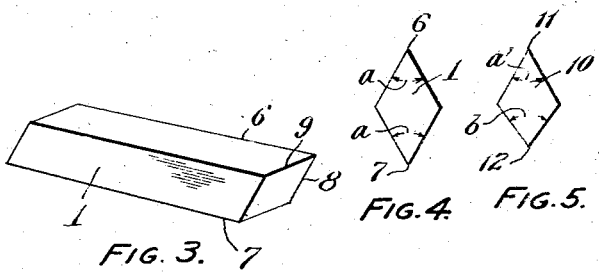
Fig. 2.   Fig. 3.   Fig. 4.   Fig. 5.
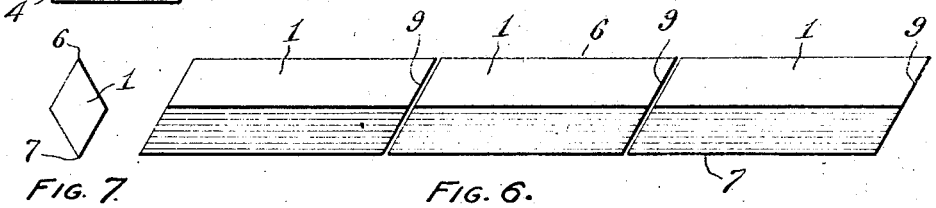
Fig. 7.   Fig. 6.
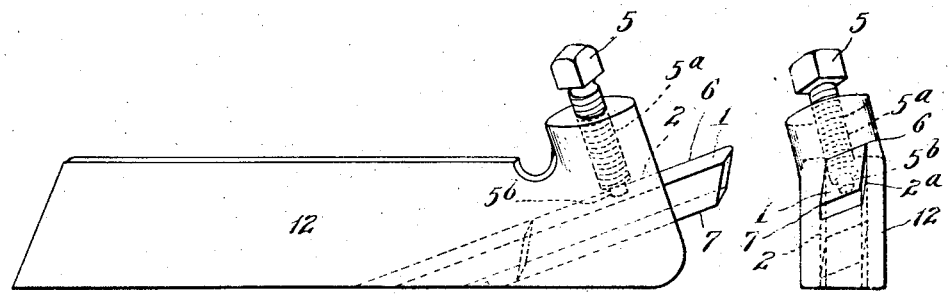
Fig. 8.   Fig. 9.
INVENTOR:
PATRICK T. LENNON
BY
B. D. Watts
ATTORNEY

UNITED STATES PATENT OFFICE.

PATRICK T. LENNON, OF CLEVELAND, OHIO.

CUTTING-TOOL AND HOLDER THEREFOR.

1,387,417. Specification of Letters Patent. Patented Aug. 9, 1921.

Application filed October 11, 1920. Serial No. 416,009.

*To all whom it may concern:*

Be it known that I, PATRICK T. LENNON, a citizen of the United States, residing at Cleveland, in the county of Cuyahoga and State of Ohio, have invented a certain new and useful Improvement in Cutting-Tools and Holders Therefor, of which the following is a specification, reference being had therein to the accompanying drawings.

This invention relates to metal cutting tools and holders therefor and is especially concerned with cutting tools formed with approved angles during their manufacture, and with holders for mounting such tools with proper side clearance at a cutting edge.

One object of the invention is to provide a cutting tool so shaped during its manufacture that no subsequent alteration of cross section is necessary to form an approved cutting angle.

Another object is to provide a cutting tool so shaped during its manufacture that no subsequent alteration of cross section is necessary to form a plurality of approved cutting angles.

Another object is to provide a cutting tool having a cutting edge, each end of which is suited to either right or left hand cutting without alteration of the cross section of the tool.

Another object is to provide a cutting tool having a plurality of cutting edges, each end of each edge being adaptable to either right or left hand cutting without alteration of the cross section of the tool.

Another object is to provide an improved form of tool holder adapted to hold a cutting tool with suitable side clearance at a cutting edge.

Other objects more or less ancillary to the foregoing will be pointed out in the appended specification.

In the class of cutting tools to which this invention relates and with which I am familiar, some tools have cutting angles formed wholly, and others have the angles formed in part during the manufacture of the tool stock, as by suitably rolling the stock. When the cutting angle is only partly so formed the cross section of the tool must be altered, as by grinding, preliminary to use, to obtain an approved cutting angle and the cutting edge is adaptable only to one hand cutting. When the cutting angle is formed wholly during the manufacture of the stock, not more than one cutting edge is provided and this edge, at each end of the tool, is not adaptable to either right and left hand cutting.

My improved cutting tool possesses all the advantages of these and other classes of tools and many additional advantages, including economies in its use incident to its cross sectional configuration, maximum strength in the direction of stress and maximum heat conducting capacity.

In the drawings which illustrate my invention, and which form a part of this specification:

Figure 1 is a perspective view of one form of cutting tool and holder assembled for right hand cutting.

Fig. 2 is an end view of the tool and holder shown in Fig. 1 but assembled for left hand cutting.

Fig. 3 is a perspective view of the tool, Fig. 1.

Fig. 4 is a cross section of the tool, Fig. 3.

Fig. 5 is a cross section of a modified form of tool.

Figs. 6 and 7 are respectively: a view in perspective of a length of tool stock as it comes from the rolling mill, one method of severing the tools being indicated; and a cross section of the tool stock.

Figs. 8 and 9 are a side and end elevation respectively of a holder adapted to hold my improved form of tool for right hand cutting.

In Figs. 1, 2, 8 and 9, the tool is mounted in an opening 2 in the head portion 3 of the holder 4. A set screw 5 serves to retain the tool in position in the holder. The tool 1, which is substantially a rhombus in cross section, has two diagonally opposed cutting edges 6 and 7 each formed by two surfaces of the tool intersecting at substantially equal, acute cutting angles, $a$, as is clearly shown in Fig. 4. These particular cutting angles, $a$, Fig. 4 are approximately 60°, which is the cutting angle generally approved for cutting wrought iron, machine and tool steel. When positioned in the holder with a side clearance of about 7 degrees, a top rake of about 23 degrees is provided which is generally accepted as being suitable for such metals.

Since the proper cutting angle is thus provided in finished form during the manufacture of the stock, no further alteration of the cross section of the tool is necessary to prepare it for use. Sharp edges and corners resulting from the severing of the tools from the tool stock must, however, be removed. When this is done, as by grinding or sharpening, the tool is ready for use.

Front clearance may be provided with a minimum of labor when the tool stock is cut into the ordinary tool lengths as indicated in Fig. 6 or may be provided by grinding just prior to using.

Each end of the cutting edge 6 of tool 1 is adaptable to either right or left hand cutting. In Fig. 1 the tool is mounted with the edge 6 arranged for right hand cutting, while in Fig. 2 the same cutting edge is used for left hand cutting. To use cutting edge 7, the tool is simply reversed in the holder to bring this edge uppermost.

In Fig. 5 a tool 10 having a substantially rhomboid cross section and two cutting edges 11 and 12 is shown. One edge 11 formed by surfaces of the tool meeting at a cutting angle, $a'$, of about 60°, is similar to the edges 6 and 7 of tool 1. The other edge, 12 is formed by surfaces meeting at a cutting angle, $b$, of about 75°, which is the angle generally approved for cutting such metals as cast iron and brass. When a tool with edge 12 in cutting position is properly mounted in a holder with a side clearance of about 5 degrees, a top rake of about 10 degrees is provided. Either of the edges 11 and 12 may be used for right or left hand cutting as described above in connection with tool 1.

It will be understood that any approved or desired cutting angle or any combination of different angles may be thus provided in a tool.

Tools constructed in accordance with my invention possess great strength and good heat conducting capacity in comparison with the ordinary tools due to the amount and distribution of metal, and to the fact that this metal is not ground away before use. The longer diagonal of the cross section being in the direction of thrust, insures maximum strength in the tool while the large cross section rapidly conducts heat away from the cutting edge.

It will be seen that I have provided a cutting tool shaped during its manufacture with any desired cutting angle and that without further alteration of its cross section, it may be mounted in its holder, with the proper side clearance at a cutting edge.

Further, each tool has a cutting edge, each end of which is adapted for either right or left hand cutting. Further, each such tool has, two cutting edges at each end, each end of each edge being adaptable for either right or left hand cutting after suitable front clearance is provided.

In Figs. 1, 2, 8 and 9, two forms of holders for use with the improved forms of cutting tools are shown. Although these holders have a straight shank and head it is to be understood that holders having heads variously inclined to the shank are comprehended by my invention. In Figs. 1 and 2, I have shown a holder, 4, adapted to receive and position with the desired side clearance, a cutting tool 1, for right and left hand cutting, respectively. In Figs. 8 and 9 a similar holder 12 suitable for use only in right hand cutting is disclosed.

The opening 2 in the head of the holder extends downwardly and rearwardly to incline the cutting tool relative to the holder as is common practice. The inclination of the side wall $2^a$ of the opening which is to be adjacent the work, preferably varies with the cross section of the tool to be mounted in the opening. For example, an inclination of about 7 degrees to the vertical would be suitable when tool 1 having a cutting angle of about 60°, is to be mounted, while an inclination of about 5°, is suitable for a tool having a cutting angle of about 75°. The desired side clearance of the tool is thus provided by proper inclination of the wall of the tool opening in the holder.

The bottom wall of the opening 2 and the side wall $2^b$ opposite the work preferably conform to the surfaces of the tool which is to be mounted.

In all forms of holders, for both single and double directions of cutting, I prefer so to incline the clamping means relative to the holder that its surface which contacts with the tool will be substantially parallel to the upper face of the tool. In the holders illustrated, the screws $5^a$ are inclined rearwardly and laterally thus bringing the flattened end $5^b$ of the screw, which is at right angles to the longitudinal axis of the screw, substantially parallel to the adjacent surface of the tool and insures contact of practically all parts of the flattened end $5^b$ with the plane surface of the tool. Such inclination of the set screw and the broad contact thereof with the tool forces the latter against the side and bottom walls of the opening 2 and holds it firmly in place. Since it is desirable to locate the set screw 5 relative to the tool described, a holder for both right and left hand cutting has two set screw holes $5^a$, as shown in Figs. 1 and 2, one for use when the tool is positioned for right hand cutting, and the other for use when the tool is positioned for left hand cutting.

For purpose of illustration I have shown and described two modifications of both cutting tool and holder constructed in accordance with my invention but I do not wish to be limited thereto since various other modifications comprehended by my invention may suggest themselves to persons skilled in the art. The scope of my invention is defined in what is claimed.

What is claimed:

1. In a device for cutting metal in combination, a cutting tool having a cutting edge, each end of the said edge being adapted for either right or left hand cutting without alteration of the cross section of the tool, and a holder having an opening adapted to receive the said tool for either right or left hand cutting and to position it with suitable side clearance at the cutting edge.

2. In a device for cutting metals in combination, a cutting tool having a plurality of cutting edges, each end of each edge being adaptable for either right or left hand cutting without alteration of the cross section of the tool, and a holder having an opening adapted to mount the said tool for either right or left hand cutting, the side and bottom walls of the opening conforming to the shape of the tool and being inclined to position the tool with suitable side clearance at a cutting edge.

3. In a device for cutting metals in combination, a cutting tool having a plurality of longitudinally extending cutting edges, each edge adapted for either right or left hand cutting, and a holder having an opening adapted to receive the said tool for either right or left hand cutting, the side and bottom walls of the said opening being so inclined as to position the tool with suitable side clearance at cutting edge.

4. In a device for cutting metals in combination, a cutting tool having a plurality of cutting angles and a cutting edge at each said angle, each end of each edge being adaptable for either right or left hand cutting without alteration of the cross section of the tool, and a holder having an opening to position an edge of the said tool for either right or left hand cutting, the wall of said opening adjacent such cutting edge being inclined to the extent and in the direction of the side clearance required by the said cutting edge.

5. In a device for cutting metals in combination, a cutting tool substantially quadrangular in cross section, a tool holder having an opening adapted to mount the tool with proper side clearance at a cutting edge for either right or left hand cutting, and a screw in the holder inclined rearwardly and laterally relative to the holder and extending in a line substantially perpendicular to the adjacent face of the tool when the latter is positioned for either right or left hand cutting, and engaging the said face to retain the tool in position in the opening in the holder.

6. In a device for cutting metals in combination, a cutting tool characterized by having a longitudinally extending cutting edge formed by two substantially equal side surfaces meeting at an acute angle, and further characterized by having a quadrangular cross section, and a holder adapted to position the said tool with proper side clearance and top rake at the said cutting edge.

7. As a new article of manufacture, a cutting tool characterized by having a longitudinally extending cutting edge formed by two substantially equal side surfaces meeting at an acute angle and further characterized by having a quadrangular cross section, whereby each end of the said cutting edge is adapted to either right or left hand cutting without alteration of the cross section of the tool, when the tool is suitably mounted in a holder.

In testimony whereof I hereunto affix my signature.

PATRICK T. LENNON.